United States Patent Office 3,313,820
Patented Apr. 11, 1967

3,313,820
2 - METHYL - 3 - HYDROXY - 5 - CYANOPYRIDINE-1-OXIDE AND CORRESPONDING 1-ALKOXY PRYIDINIUM ALKYL SULFATE SALT
Takeo Naito, Ichikawa-shi, Toru Yoshikawa, Urawa-shi, and Fumiyoshi Ishikawa, Ichikawa-shi, Japan, assignors to Daiichi Seiyaku Company, Limited, Chuo-ku, Tokyo, Japan
No Drawing. Filed Mar. 12, 1965, Ser. No. 439,474
Claims priority, application Japan, Mar. 12, 1964, 39/13,714
2 Claims. (Cl. 260—294.8)

This invention relates to a process for preparing 2-methyl-3-hydroxy-4,5-dicyanopyridine and further relates to the novel chemical compounds for use in the preparation of the same.

2-methyl-3-hydroxy-4,5-dicyanopyridine is an intermediate for vitamin $B_6$ and was produced by condensation of ethoxymethylene succinonitrile with an alanine ester (Makino et al.: Bulletin of the Chemical Society of Japan, 19, 1, 1944) or by condensation of 4-methyl-5-ethoxyoxazole with fumaronitrile (E. E. Harris et al.: Journal of Organic Chemistry, 27, 2705, 1962).

It is an object of the present invention to provide an economical and convenient method for synthesizing 2-methyl-3-hydroxy-4,5-dicyanopyridine.

It is another object of the present invention to provide a method for preparing the above compound in a simple manner and with high yield. According to the present invention, 2-methyl-3-hydroxy-5-cyanopyridine is oxidized in glacial acetic acid with hydrogen peroxide to produce 2 - methyl - 3 - hydroxy-5-cyanopyridine-1-oxide which is then treated with a di-lower alkyl sulfate for conversion into 1-lower alkoxy-2-methyl-3-hydroxy-5-cyanopyridinium lower alkyl sulfate. The sulfate is further treated with an alkali metal cyanide to produce the desired 2-methyl-3-hydroxy-4,5-dicyanopyridine.

The process of the present invention may be illustrated as follows:

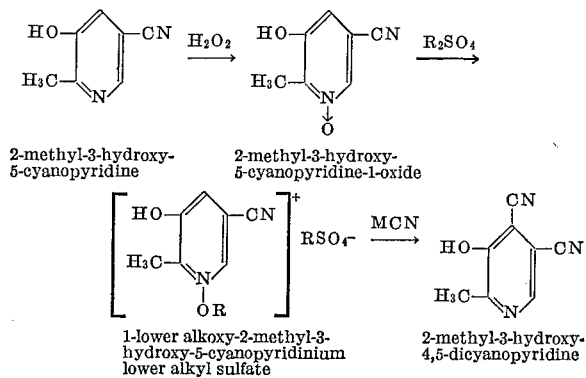

2-methyl-3-hydroxy-5-cyanopyridine
2-methyl-3-hydroxy-5-cyanopyridine-1-oxide
1-lower alkoxy-2-methyl-3-hydroxy-5-cyanopyridinium lower alkyl sulfate
2-methyl-3-hydroxy-4,5-dicyanopyridine wherein R represents a lower alkyl group and M represents an alkali metal.

The steps in the above formula will be given in further detail.

2-methyl-3-hydroxy-5-cyanopyridine, when allowed to react with hydrogen peroxide in glacial acetic acid by heating to from 50° to 120° C., preferably from 70° to 100° C., most preferably from 95° to 100° C., gives 2-methyl-3-hydroxy-5-cyanopyridine - 1 - oxide in 73–80% yield. This substance is a new compound, colorless crystals with a decomposition point of 278°–280° C. Properties of this compound are indicated below:

TABLE OF PROPERTIES I

| | |
|---|---|
| Crystal, form | Needless. |
| Crystal, color | Colorless. |
| Melting point (decomp.) | 278°–280° C. (decomp.). |
| Solubility | Soluble in methanol and ethanol, sparingly soluble in ether and benzene. |

2-methyl-3-hydroxy-5-cyanopyridine-1-oxide is alkylated with di-lower alkyl sulfates by heating at a temperature of from 70° to 150° C., preferably 80° to 130° C., most preferably 100° to 110° C., to obtain 1-lower alkoxy-2-methyl-3-hydroxy - 5 - cyanopyridinium lower alkyl sulfate. The ethyl sulfate having decomposition point of 129°–130° C. is obtained in 82 to 85% yield. The di-lower alkyl sulfates includes those where the alkyl groups have 1 to 4 carbon atoms, preferably methyl and ethyl. The alkoxy likewise are those having 1 to 4 carbon atoms. The resultant lower alkyl sulfates are novel compounds, properties of which are given below.

TABLE OF PROPERTIES II

| R | OR | Crystals | | Melting (decomp.) point, °C. | Solubility |
|---|---|---|---|---|---|
| | | Form | Color | | |
| $CH_3$ | $CH_3$ | Syrupy oil | Light yellow | | Soluble in $H_2O$, $CH_3OH$, $C_2H_5$—OH Acetone; sparingly soluble in benzene, ether. |
| $C_2H_5$ | $C_2H_5$ | Needless | Colorless | 129–130 | |

The 1-lower alkoxy - 2 - methyl-3-hydroxy-5-cyanopyridinum lower alkyl sulfate thus obtained is then allowed to react with an alkali cyanide in an aqueous solution at a lower temperature to produce 2-methyl-3-hydroxy-4,5-dicyanopyridine having a melting point of 189°–190° C., which is obtained in 78–80% yield. The alkali cyanides include sodium cyanide and potassium cyanide. The "lower" temperature is from 0° to 20° C., preferably from 0° to 10° C., most preferably from 5° to 7° C.

In the present process, we have found that the cyano group is introduced specifically in the $C_4$-position of the pyridine nucleus. Conventionally, the cyano group was introduced in the $C_2$- or $C_6$-position. References have been made to this fact, for example, in Okamoto and Tani: Chemical and Pharmaceutical bulletin, vol. 7, p. 130 (1959), and W. E. Feely et al.: Journal of the American Chemical Society, vol. 81, p. 4004 (1959).

In the process of the present invention, isolation of the 1-lower alkoxy-2-methyl-3-hydroxy - 5 - cyanopyridinium lower alkyl sulfate is not required, and it is also possible to subject directly the reaction product obtained by alkylating 2-methyl-3-hydroxy-5-cyanopyridine-1-oxide to the subsequent reaction with an aqueous solution of an alkali metal cyanide. Thus, the operation is simplified and yet a high yield is ensured.

The following examples illustrate specific methods of carrying out the present invention, but it is to be understood that these examples are given by way of illustration and not of limitation.

*Example 1.*—Into 90 ml. of hot glacial acetic acid, 4.0 g. of 2-methyl-3-hydroxy-5-cyanopyridine was dissolved, and then, with the addition of 6 ml. of 30% hydrogen peroxide, heated in a boiling water bath for one hour. Again, with the addition of 6 ml. of 30% hydrogen peroxide, the mixture was heated for one hour. The above procedure was repeated three times altogether. By further heating for 4 hours, the reaction was brought to an end. After half the total amount of acetic acid was distilled off, the solution was allowed to cool, and the precipitated crystals were filtered. The yield was 2.9 g. On concentration, the filtrate gave further 0.4 g. of crystals. Altogether, 3.3 g. (73.4%) of 2-methyl-3-hydroxy-5-cyanopyridine-1-oxide, M.P. 278°–280° C. (decomp.), was obtained.

Analysis for $C_7H_6N_2O_2$. Calculated (percent): C, 56.00; H, 4.03; N, 18.66. Found (percent): C, 55.68; H, 4.08; N, 18.10. Ultraviolet absorption: $\lambda_{max.}$ 241 m$\mu$, 328 m$\mu$ (in ethanol).

A thorough mixture of 0.7 g. of 2-methyl-3-hydroxy-5-cyanopyridine-1-oxide obtained above and 0.7 g. of diethyl sulfate was heated in an oil bath at 100°–110° C. The reaction mixture was gradually colored and melted together. After two hours, the reaction was brought to an end, and the resultant solidified on cooling. The said solid matter was washed with a small amount of acetone to give 0.85 g. of crystals. From the filtrate, 0.31 g. of crystals was further obtained. Altogether, 1-ethoxy-2-methyl-3-hydroxy-5-cyanopyridinium ethyl sulfate, M.P. 129°–130° C. (decomp.), was obtained in 82.1% yield.

Analysis for $C_{11}H_{16}N_2O_6S$. Calculated (percent): C, 43.41; H, 5.31; N, 9.22. Found (percent): C, 43.75; H, 5.56; N, 9.06.

Into 5 ml. of water, 1.5 g. of 1-ethoxy-2-methyl-3-hydroxy-5-cyanopyridinium ethyl sulfate obtained above was dissolved and cooled to 5° C. This solution was introduced dropwise with stirring into a solution of 0.54 g. of sodium cyanide in 8 ml. of water at 5°–7° C. over a period of 25 minutes. After the completion of the dripping, the temperature was gradually raised to room temperature, and then the mixture was allowed to stand for 1.5 hours. The reaction solution was acidified with hydrochloric acid (to pH 2), and precipitated crystals were collected by filtration, whereupon 0.75 g. of 2-methyl-3-hydroxy-4,5-dicyanopyridine, M.P. 189°–190° C., was obtained in 85% yield in terms of the monohydrate. On drying, the product turns to a yellowish crystalline powder.

Analysis for $C_8H_5N_3O$. Calculated (percent): C, 60.37; H, 3.15; N, 26.40. Found (percent): C, 59.73; H, 3.36; N, 26.81.

The product, when melted in mixture with an authentic sample synthesized according to the Harris' process, showed no drop in the melting point. Also, it entirely agreed with the latter in ultraviolet and infrared absorption values.

*Example 2.*—A mixture of 0.6 g. of 2-methyl-3-hydroxy-5-cyanopyridine-1-oxide prepared according to Example 1 and 0.55 g. of dimethyl sulfate was heated at 100°–110° C. for two hours. The mixture was gradually colored and melted to give reddish oily substance which would not solidify on cooling. This oily substance was dissolved in 5 ml. of water, and introduced, while being cooled with ice water, dropwise into a solution of 0.65 g. of potassium cyanide in 8 ml. of water at 5°–7° C. The temperature of the reaction solution was gradually raised to room temperature, and the solution was allowed to stand for 1.5 hours. The reaction solution was acidified with hydrochloric acid, and the precipitated crystals was filtered and collected to give 0.55 g. of 2-methyl-3-hydroxy-4,5-dicyanopyridine in a 78% yield in terms of the monohydrate. On drying, the product turned to a yellowish crystalline powder, M.P. 189°–190° C.

What is claimed is:
1. 2-methyl-3-hydroxy-5-cyanopyridine-1-oxide having the formula:

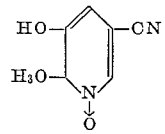

2. 1-lower alkoxy-2-methyl-3-hydroxy-5-cyanopyridinium lower alkyl sulfate having the formula:

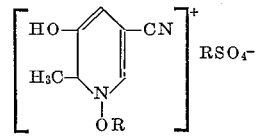

References Cited by the Examiner
UNITED STATES PATENTS

| | | | |
|---|---|---|---|
| 2,971,002 | 2/1961 | Feely | 260—294.9 |
| 2,991,285 | 7/1961 | Feely | 260—294.9 |

WALTER A. MODANCE, *Primary Examiner.*

ALAN L. ROTMAN, *Assistant Examiner.*